KOROTKOFF SOUNDS FILTERED

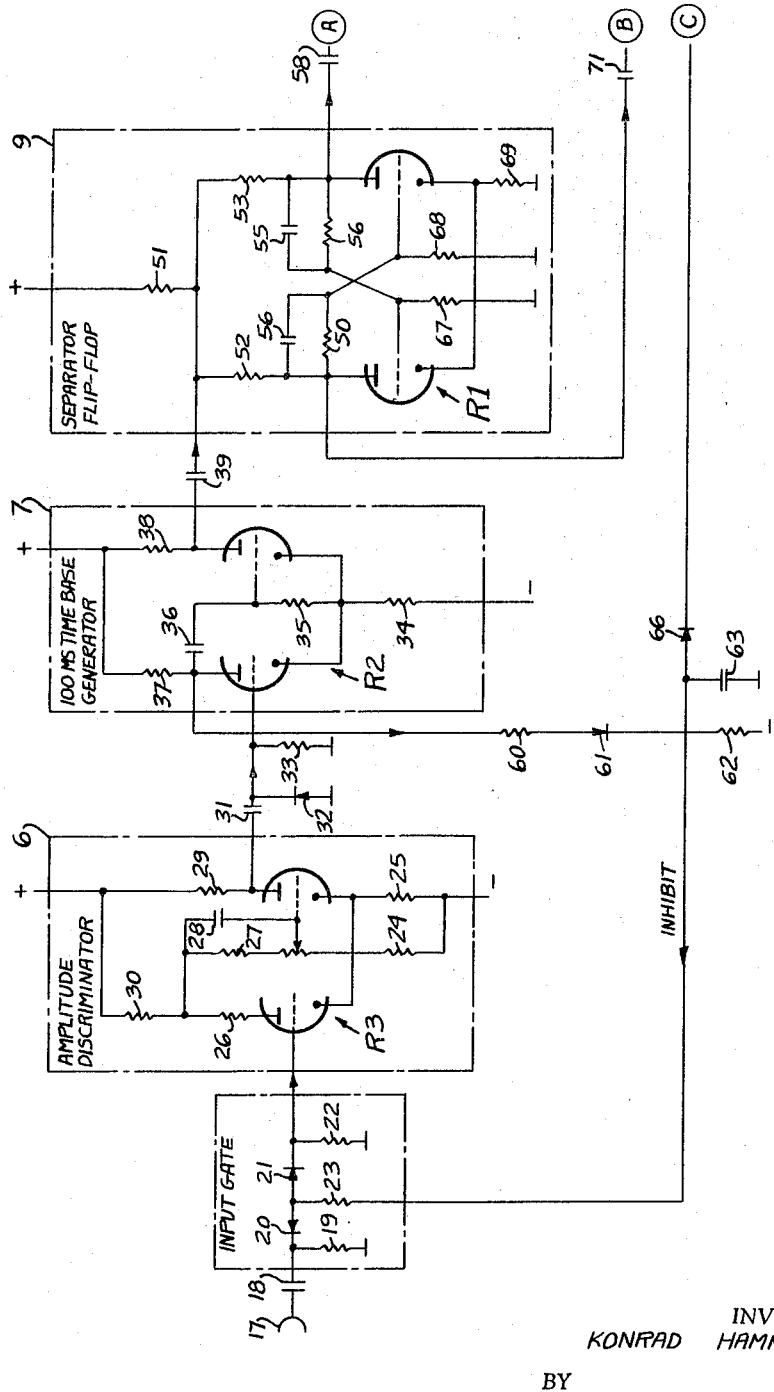

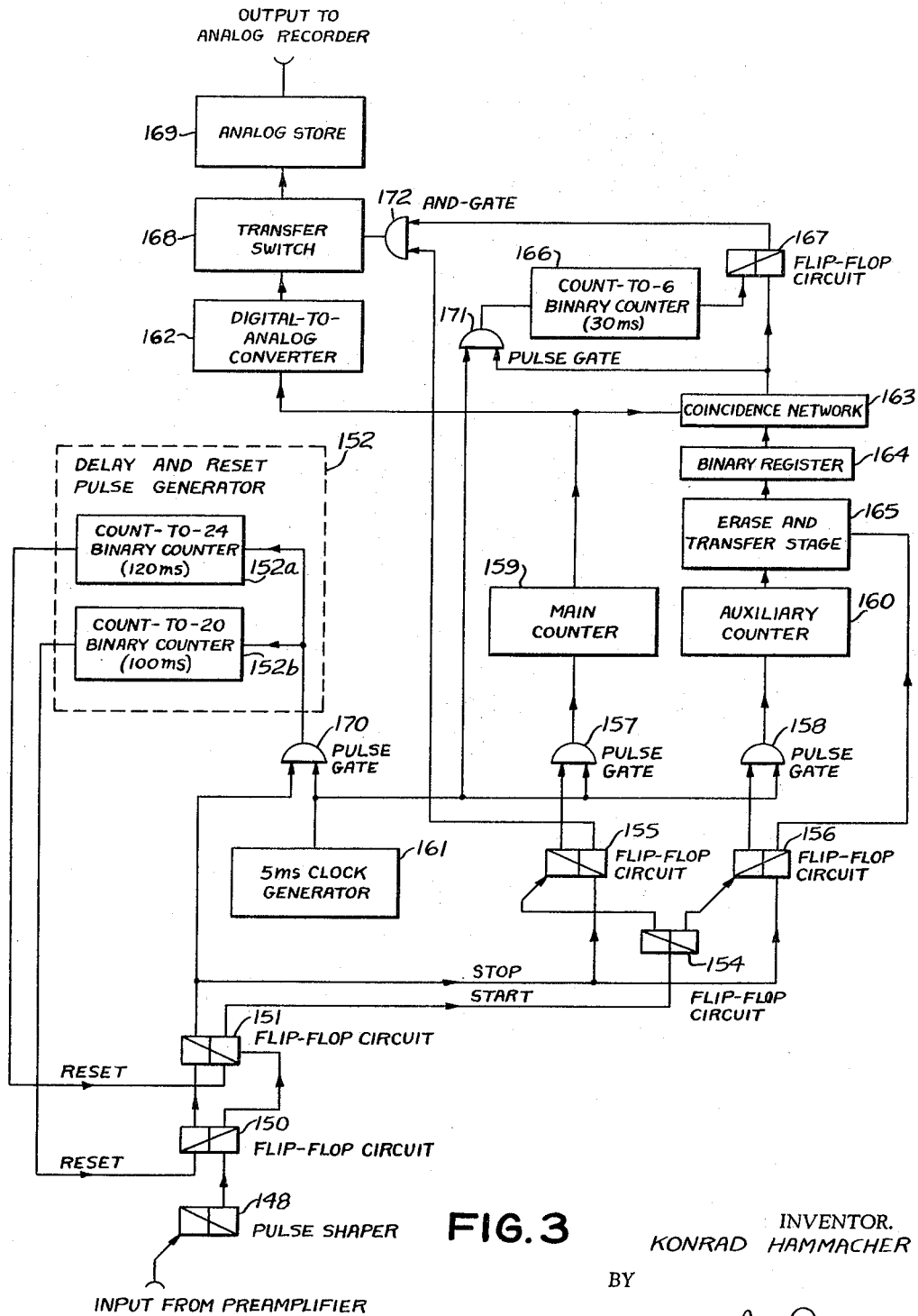

CAROTID PULSE

RADIAL PULSE

ELECTROCARDIOGRAM

PHONOCARDIOGRAM

3,318,303
METHOD AND APPARATUS FOR OBSERVING HEARTBEAT ACTIVITY
Konrad Hammacher, Kuehlwetterstrasse 28,
4 Dusseldorf, Germany
Filed Jan. 14, 1965, Ser. No. 429,193
Claims priority, application Germany, Dec. 6, 1962,
H 47,593; Jan. 16, 1964, H 51,405
29 Claims. (Cl. 128—2.05)

This application is a continuation-in-part of application Ser. No. 285,772, now abandoned.

This invention relates to a method and apparatus for accurate determination of the heartbeat frequency, to be used for supervising the heart activity when in addition to the measurable and distinct pulses resulting from heart activity, there are also some disturbing influences with intensities a few orders of magnitude above those produced by heart activity.

The method and apparatus of this invention are especially useful for determining the general condition of an unborn child during its birth. The heartbeat frequency gives information as to the possibility of damage to the fetus from oxygen shortage. Previous efforts to determine fetal heartbeat frequencies by electronic methods have not been very successful. This is primarily because of the unfavorable ratio of noise level to useful signal level, since the disturbances caused by movements of the child, pulse of the mother, movements of the mother, or intestinal noises sometimes exceed the useful signal level by 40 to 60 db, and even with maximum filtering such noise cannot always be suppressed. A further difficulty is due to variations of intensity of fetal heart sounds resulting from changing fetal positions and pressure changes caused by labor activity.

With most of the known contrivances an effort is made to sift out one specific heart sound per heart action period and to suppress the remaining heart sounds. For this purpose a dead or idle or non-response time was usually introduced after the first or second heart sound which would overlap the undesired heart sound and would also exclude all other undesired noises. This, however, involves serious difficulties because there would then be no assurance that it would always be only the first heart sound or only the second heart sound which would initiate the idle period. Also, only a relatively small heartbeat frequency range would be covered with a fixed idle time, because if the heartbeat frequency increases above a given limit, there would be a possibility of the next following heart sound falling partly or entirely within the idle time, or with a lowering of the heart sound frequency, the heart tone to be suppressed may fall outside the idle time.

Efforts have also been made to ascertain the periodical rhythm of the first or second heartbeat by the "track-while-scan" system by which rhythm determinations and corrections thereof are done simultaneously in a definite manner. The rhythm determination is, however, appreciably interfered with by accumulations of disturbing noises. The manipulation of such an apparatus is not simple and requires skilled technicians. Furthermore, the known types of apparatus do not give dependable limiting values automatically at the critical moments.

This invention has for its object a method and an apparatus for determination of the heartbeat frequency, especially of a fetus, which would not be very sensitive to disturbances, and which would be simple in operation so that it could be used in clinics without requiring skilled technicians.

According to the method of the invention during each heart period, at least two characteristic events of the cardiac activity are evaluated in that way that each event is transformed into an impulse. These impulses are then fed into time measuring circuits which determine whether the temporal relationship characteristic for the pertaining cardiac activity prevails for at least two heart action periods. Any disturbances which cannot be eliminated from the desired signal by virtue of their being different in amplitude, duration or waveform will give rise to impulses as well as the desired signals. However, since these impulses are generally generated at random, no characteristic temporal relationship between themselves and the cardiac signals can be found by the time measuring circuits through time comparison. Only if a minimum of four successive impulses occur in the sequence prescribed by the pertaining heart action, an indicating pulse is generated which allows utilization of the pulse distances measured, for instance, for heart beat frequency indication.

It has been found advantageous to use the first heart sound and the second heart sound as such characteristic events in a heart action period. Since the systolic action period is physiologically shorter than the diastolic action period, the two resulting pulse sequences do not have double the heartbeat periods, but they are two phase-shifted pulse trains, each having the heartbeat frequency.

For reasons of simplicity of method as well as apparatus, two such characteristic events within a single heart action cycle are preferably used, but it will become more apparent later in the specification, that more than two characteristic events can be used.

According to another aspect of the invention, as disclosed hereafter in another embodiment, it has been found unnecessary to evaluate at least two or more characteristic pulse peaks from a single heart action cycle.

The objects of the invention may be realized if impulse spacings are used as a basis for comparison if they occur in a certain order during successive cycles.

One or more periodically repeated heart activity cycles are evaluated in such a manner that each of these cycles is converted into an impulse. Periodic measurements are made of the time interval between the impulses where the impulses have a certain phase length or phase spacing up to one period. A comparison is made of successively measured impulse spacings and when at least two impulse spacings occur in a predetermined timed relation to each other an impulse is used for signalling purposes.

In the following there will be described an electric apparatus comparing a time interval produced between two first heart sounds with a time interval produced as occurring between two succeeding second heart sounds. Proper evaluation, however, is also possible using the time interval in between the first and second heart sound in one action cycle and the time that elapses from the second heart sound of one cycle to the first heart sound of a neighboring cycle. It is also possible to combine electro-cardiographic and phonocardiographic methods, for example, the R peak of the EKG with a first heartbeat, by means of a gating circuit, so as to ensure detection of the respective first heartbeat within any cycle.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawings, in which:

FIGURES 2 and 2a taken together show a detailed wiring diagram of a circuit network having as input duly amplified heart sounds, and as output a signal indicative of heart rate frequency responsive signal;

FIGURE 3 illustrates a block diagram of an apparatus in accordance with the invention operating in the digital mode;

Figure 1:
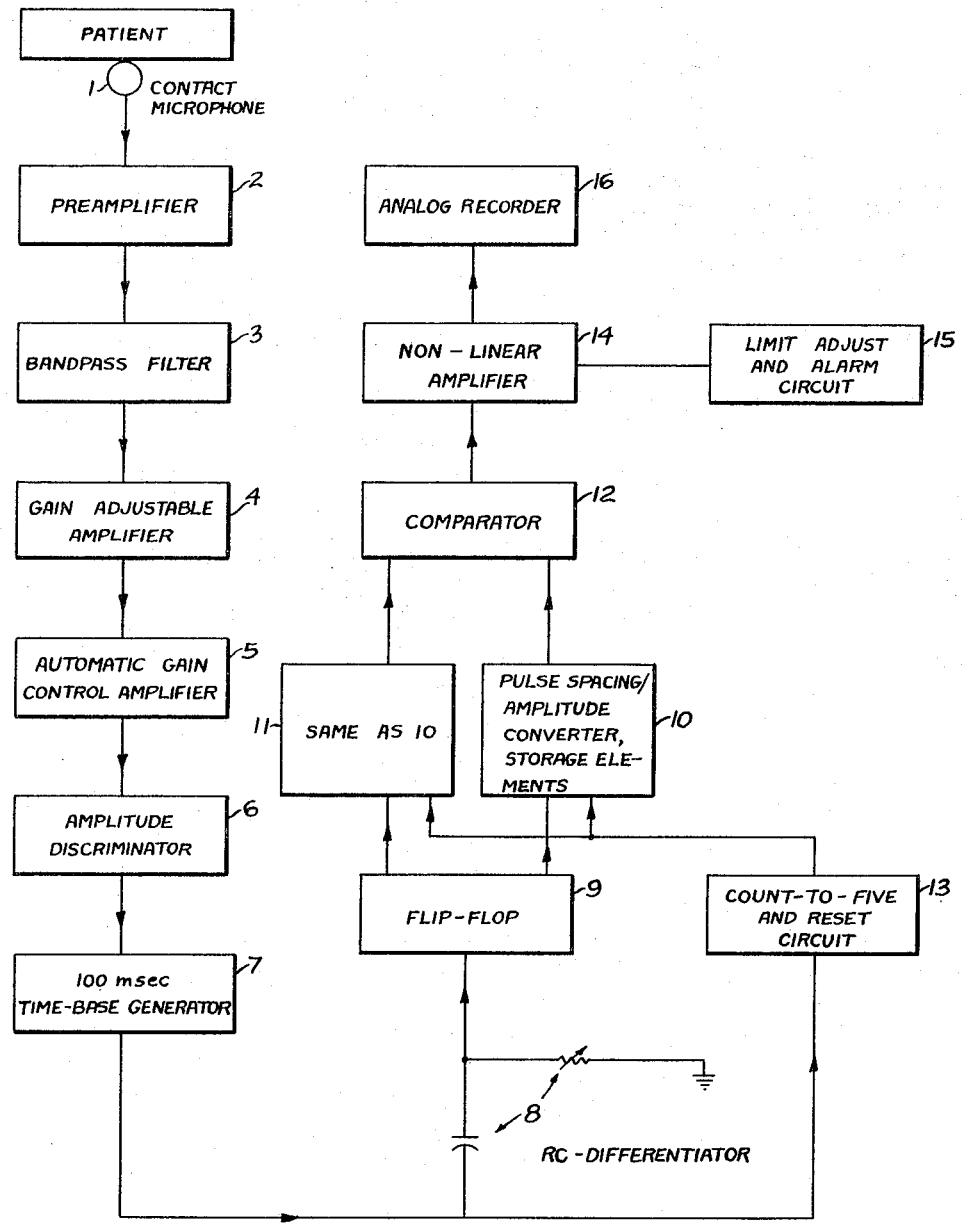
FIGURE 1 is a block diagram of the first embodiment of the invention.

This invention will now be described in detail with reference to the drawings, particularly FIGURE 1, showing diagrammatically one example.

The acoustic signals of heart activity are obtained with a body-noise microphone 1 which is connected to a preamplifier 2. This microphone preferably is an electroacoustic transducer or a pair thereof in case a directional component is desired so that not only the fetal heart can be checked on per se, but prior thereto the location thereof, for receiving optimum output, can be detected if a pair of transducers is being used. The microphone or microphones can be of the acceleration type.

The preamplifier 2 has a lower frequency limit of 35 cycles per second and a suitably chosen amplification factor of about 100. The output of this preamplifier passes through a bandpass filter 3 which transmits frequencies from 50 to 95 beats per minute, having a flank damping or attenuation of 35 decibels per octave. Besides filtering out the disturbing noises, the effect of this bandpass is to give the first and second heart sounds about the same output amplitude.

It is pointed out that the electroacoustic transducer may already have frequency selective characteristics for supporting or even substituting bandpass filter 3.

The bandpass filter 3 as selected provides a suitable operating level in relation to the noise. In extreme cases, the lower limit frequency of bandpass 3 can be made adjustable to vary, for example, between 45 to 55 cycles per second (c.p.s.). However, it has been found that a constant band width in the range from 50 to 95 c.p.s. at an attenuation of 35 db per octave at the limits suffices.

After the bandpass filter 3 there is connected in circuit a controllable amplifier 4, with which the heart sound signals can be given optimum amplification for the following network.

The output signals of amplifier 4 then pass through a regulating amplifier 5, preferably an automatic volume control (a.v.c.) amplifier by which the unavoidable amplitude fluctuations of the heart sounds are kept approximately within the limits of ±15 db.

Utilization of an amplifier with automatic volume control or automatic gain control (a.g.c.) has the advantage that noise level fluctuations of the heart do not detrimentally influence the proper function of the apparatus. The amplifier 5 shall not cut off the amplitude peaks but is to control automatically the amplifier gain so that the distance between noise level and signal output level remains approximately constant.

The output from amplifier 5 is fed into an amplitude discriminator 6, for example a Schmitt trigger, for producing trigger impulses out of the first and second heart sounds. The amplitude discriminator serves to sort out pulses and to suppress others so that only pulses of a particular height serve for later triggering of a pulse generator. Those pulses when sorted out are then transmitted to an idle time base generator 7 which produces rectangular voltage (or current) pulses with a flat period of 100 milliseconds (msec.). The time base of this generator is selected to cover the transient decay time resulting from each individual heart sound first or second. 100 milliseconds are certainly sufficient.

It is apparent that upon triggering generator 7, it blocks in effect further transmission of any pulses detected and passing on through discriminator 6 for the period of the time base, namely 100 milliseconds. Specific utilization of this pulse will be explained in detail with reference to FIGURE 2. It can be said these output pulses of generator 7 are being used twofold. Once, for the duration of such pulse no further transmission of signals pertaining to heart action is possible, for example, the generator pulse can be fed back to block the discriminator or any of the amplifiers. The second utilization is that it transforms the selected heart sounds into uniform pulse of given height and duration. In the following, the pulses from generator 7 shall be called blocking pulses and/or measuring pulses.

Using a time of 100 ms. as duration for each blocking and measuring pulse, one could basically detect a pulse rate of up to 600 pulses per minute. Since, however, two heart sounds are used for each heart action cycle, the maximum heart rate that can be detected is 300 heart actions per minute. Physiologically, a heart rate of 200 beats per minute is the maximum to be expected. At such a fast pathological heartbeat frequency the time ratio of systolic period to diastolic period would change from 1:2 to about 1:1. Thus, one could prolong the 100 millisecond time base by an additional 20 milliseconds without, in fact, reducing the power of resolution.

The additional 20 milliseconds are, however, of salient importance.

All noise still passing through filter 3 having an amplitude or peaks up to the trigger level would trigger the generator 7.

Particularly, noise of long duration (i.e., groups of noise peaks all reaching trigger level) will always trigger a measuring and blocking pulse sequence, each at time base length and with the leading edge of one pulse being spaced less than twenty milliseconds from the trailing edge of the preceding pulse.

It is understood that only those measuring pulses succeeding each other at more than 20 milliseconds will be evaluated. Thus, in case of a compiling of noise, such noise is still sufficiently suppressed.

A strong interrelation of band filter pass band and of the additional idle time of 20 milliseconds follows from the fact that the output of bandpass filter 3 has only sinusoidal waves of 50 to 95 cycles per second with the longest waves of 50 cycles per second having an oscillation period of just 20 milliseconds. Thus, all signals passing through filter 3 and being large enough to reach trigger level and lasting for more than 100 milliseconds, will in fact, be eliminated from the later comparison.

In order to achieve the latter objection, means are provided for limiting the effective power of resolution to a period of time corresponding to the length of the time base (100 milliseconds) plus the period of the lower frequency limit of bandpass filter 3.

The measuring pulses from generator 7 having a length of 100 milliseconds is being pushed onto a differentiating stage 8 of large time constant. The large time constant of differentiator 8 ensures that the differentiation of the trailing edge de-sensitizes the apparatus for an additional 20 milliseconds.

The adding of an additional 20 milliseconds to the time base of 100 milliseconds can also be accomplished in a different manner. The apparatus may comprise a differentiating circuit 8 having small time constant being connected to generator 7 as aforedescribed. A monostable multivibrator having a delay period of 120 milliseconds is inserted between the differentiating circuit 8 and the flip-flop 9. This monostable multivibrator may, for example, be triggered by the leading edge of the measuring pulse from generator 7 and in turn trigger flip-flop 9. The next triggering of the monostable multivibrator is possible only after its delay period of 120 milliseconds has elapsed.

An adding of 20 milliseconds to the time base of 100 milliseconds by way of digital components will be explained with reference to FIGURE 3.

The flip-flop circuit 9 effects a separation of the first from the second heart sound in that the alternating appearance of these two heart sounds switches flip-flop 9 back and forth.

The two output terminals of the flip-flop circuit 9 are correspondingly representative of each heart sound and are respectively connected to two pulse distance-amplitude converters including storage elements 10 and 11. To be more specific, converter 10, for example, is responsive to the time elapsing from one first heart sound to the next first heart sound, and the output voltage produced by converter 10 is proportional (or otherwise monotonously related) to a respective systolic beat to systolic beat time intervals. Since two characteristic events in each heart action period are being used, this latter time interval is determined by the temporal distance of one switching of flip-flop 9 to the next second one, in other words, the first heart sound always causes flip-flop 9 to switch into one and the same state, and two succeeding switching actions of like direction determine the time interval converted by converter 10. The second heart sound switches flip-flop 9 always in the opposite direction, and converter 11 produces an output voltage proportional to two such switching actions of flip-flop 9.

The voltages respectively generated in these converters by means of integrators are delivered to a comparator 12 for mutual comparison. If the voltages are similar, one of them is transmitted to the amplifier 14 which has a hyperbolic transfer characteristic to make the signal proportional to heart rate and from here to the recording apparatus 16 and to two threshold circuits 15 for giving an alarm when prescribed limits are exceeded. Between the amplifier 14 and the recording apparatus 16 a stretcher circuit (not shown) can be provided. The analog recorder will then show the previous beat frequency until by comparison a new value is established.

To the output terminal of the time base generator 7 rectangular is further connected a rectangular pulse counter 13 which delivers to stages 10 and 11 reset pulse after every fifth pulse out of generator 7. These pulses arriving at the storage elements of the pulse distance amplitude converters reset them to zero. This will further reduce the amount of disturbance. It is thus apparent that measuring pulses 7 perform a third function, namely, that of resetting.

The resetting device includes the count-of-five counting element 13 and resets to zero the converter stages 10 and 11 after every five individual heart sounds (roughly after two and a half heart action cycles) for the following reasons: if a disturbance results from a disturbing noise following immediately any single heart sound but extending beyond the occurrence of the following heart sound, the above-mentioned limiting of the resolving power (adding 20 milliseconds) would be insufficient. In the absence of the resetting device, pulse comparison would now yield a measuring value of about half the true heartbeat frequency. Elimination of this source of error is carried out in that due to the added idle period of twenty milliseconds, only three pulses are produced out of the five output pulses which should come from generator 7. Since no more than three pulses are effective, there will be no comparison and, of course, no counting and no resetting, because for any one comparing step one needs at least four distinct pulses from generator 7 regardless of their origin.

The various components of the apparatus of this invention, as for example, the 20 milliseconds idle time switch, the device for separating the first from the second heartbeat, the time interval comparing apparatus, the comparator, etc., can assume many different forms which would be obvious to one skilled in the electronics art.

Figure 2A:
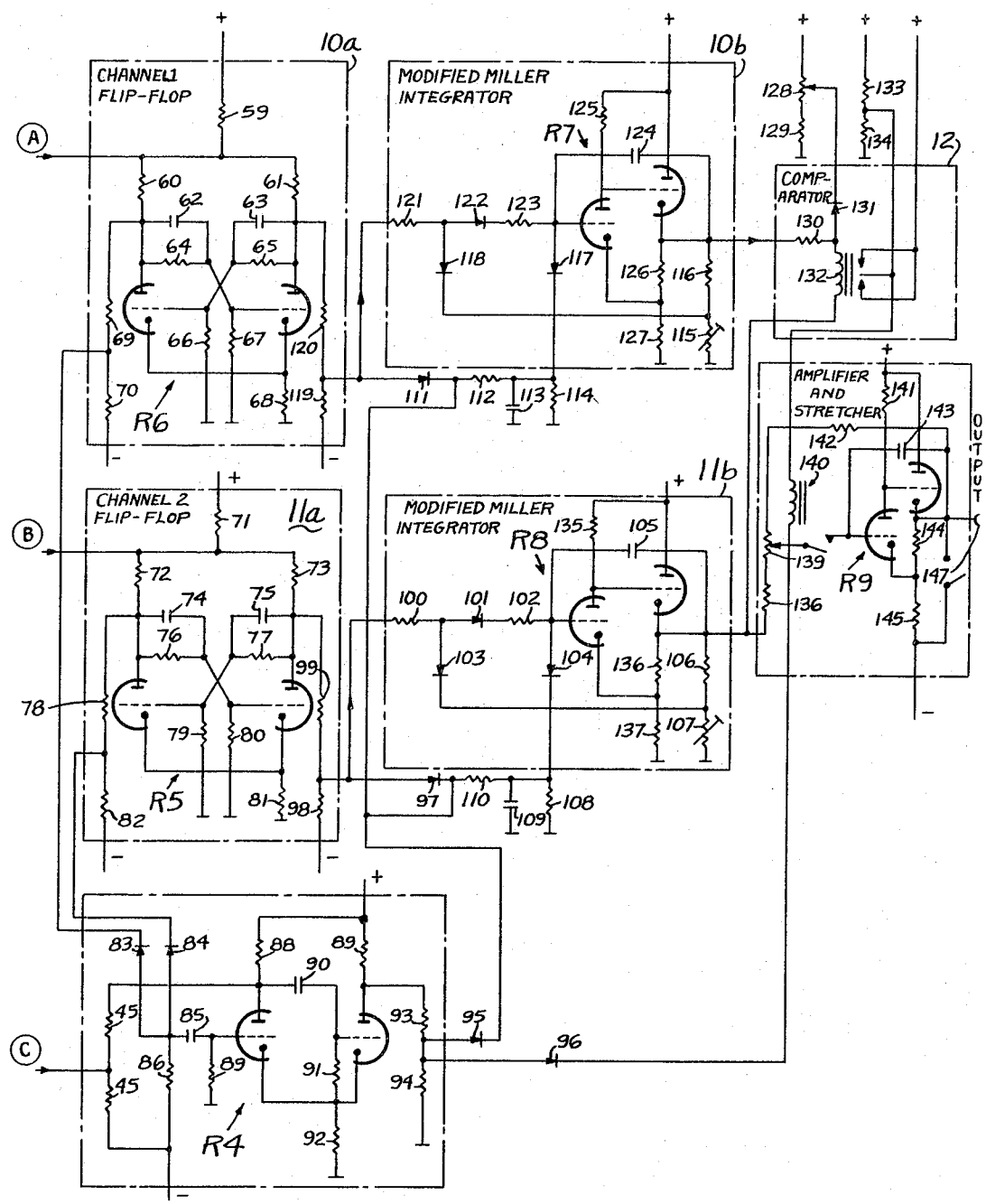
Figure 8:
FIGURE 8 shows a graph of a characteristic heart sound, known as "Korotkoff" sounds (filtered) which may be utilized in blood pressure measurement.

FIGURE 2 shows a detailed wiring diagram of a portion of the apparatus of an embodiment of this invention, with the exception of the amplifying, controlling and filtering units which are well known components.

The stage R3 represents discriminator 6 of FIGURE 1 constituted by a conventional Schmitt trigger. At the input to this pulse discriminator there is a switch that blocks the signal during the 100 millisecond idle time and also during the comparing and operating time of 10 to 20 milliseconds.

Terminal 17 is main input terminal for this Schmitt trigger to connect same to the amplifiers as aforedescribed. The pulses appearing at terminal 17 are passed through a capacitor 18 and the switch composed of resistors 19, 22 and 23, and diodes 20 and 21, interconnected, as illustrated. This switch operates as a gating circuit in which the gating voltage is applied to a series connection of a diode 41 and a resistor 40, the diode being approximately biased through a resistor 42. The switching or gating voltages are derived from a monostable multivibrator R2 to be described below. The Schmitt trigger R3 is composed of two electron tubes and ohmic resistors 24 through 30 and a potentiometer 57, interconnected as known per se and illustrated. The output of Schmitt trigger R3 is capacitively coupled to the next stage R2.

The stage R2 is a monostable multivibrator which serves as a time base generator 7 for the idle time. Monostable multivibrator R2 is composed of two electron tubes and resistors and capacitors (elements 31 to 39) conventionally interconnected.

As can be seen from the drawings, the monostable multivibrator R2 has actually two output terminals concurrently operating. One output terminal leads to resistor 40 for blocking the pulse transmission between terminal 17 and discriminator R3 for the period of time delay for the monostable multivibrator (100 milliseconds). The other output line of monostable multivibrator R2 leads to a flip-flop R1 which is the heart sound separator stage 9 of FIGURE) 1. This flip-flop R1 is comprised of elements 47 through 56 conventionally interconnected and having two capacitive output lines 58 and 71.

Each pulse permitted to trigger monostable multivibrator R2 from stable to unstable state, causes triggering of flip-flop R1. It can be selected whether flip-flop R1 be triggered when multivibrator R2 flips from stable to unstable state, or when the reverse occurs after the 100 milliseconds has elapsed.

The R5 and R6 stages which follow are also flip-flop stages and pertain to stages 10 and 11, respectively, of FIGURE 1. The ouput of R5 and R6 stages give a rectangular signal whose length is indicative of the time elapsing between two first heart sounds and two second heart sounds respectively. Stages R1, R6 and R5 respond only to positive signals. Flip-flop R5 is comprised of elements 71 to 81 whereas flip-flop R6 is comprised of elements 59 through 70, conventially interconnected. The flip-flop stages R6 and R5 switch in the two integrators R7 and R8, respectively, being of the Miller type.

The here measured timep period here measured when flip-flops R5 and R6 are both in the "off state" is sensed by the logic "and" circuit comprised of the two diodes 83 and 84 and of resistor 86, which diodes are connected to these respective output terminals of flip-flops R5 and R6 which are not connected to the integrator stages. This logic "and" circuit governs the input of an evaluating and resetting generator R4, which is a monostable vibrator comprised of elements 87 through 93 conventionally interconnected.

The two flip-flops R5 and R6 are connected to integrators R7 and R8 respectively, as stated. Integrator R7 is comprised of two tubes and circuit elements 115 through 129, conventially interconnected and having in addition a resetting network comprising diode 111, resistors 112 and 114, and capacitor 113. This resetting circuit is connected to monostable multivibrator R4 by way of diode 95.

It will be observed that resetting occurs whenever there is simultaneously an output of the flip-flops R6, R5 and the monostable multivibrator R4. Complete resetting requires cooperation of diode 97 pertaining to the resetter network for integrator R8 being otherwise composed of elements 98 through 109 and 136 to 139, interconnected in a manner analogous to integrator R7. The two integrators R7 and R8 are provided with nonlinear networks using the exponential characteristics in the forward conduction range of diodes 101, 103 and 118, 122, respectively, serving this purpose and modifying the charging current for integrating capacitors 105 and 124.

The integrators R7 and R8 are charged with time dependent voltages which become smaller with longer integration periods. The time dependent charging curve corresponds to an exponential function. On this basis the hyperbolic dependency of the heartbeat frequency on the heart-period duration can be sufficiently linearized.

The integrated time signals are applied to relay 132 having a central resting position and feeding a comparator signal through the subsequent relay 140 with a one-sided resting position. Relay 140 responds only when the measuring voltage is the same at both integrators. Diode 96 as connected to relay 140 ensures evaluation only during the monostable multivibrator response period of multibrator R4.

At the outlet of integrator R7 there is a limit value switch (diode 131 being the salient element for introduction of the upper heartbeat frequency.

Circuit elements 43, 44, 45 and 46 render the input circuit of discriminator R3 sensitive or insensitive in strict accordance to the monostable multivibrator action of element R4.

Elements 141 to 148 comprise an amplifier output stage R9.

The individual parts of the circuit have the following values:

| Element | Value |
|---|---|
| 17 | Input. |
| 18 | 0.5 mf. |
| 19 | 50K ohm. |
| 20 | Ge-diode. |
| 21 | Ge-diode. |
| 22 | 2M ohm. |
| 23 | 1M ohm. |
| 24 | 100K ohm. |
| 25 | 40K ohm. |
| 26 | 10K ohm. |
| 27 | 190K ohm. |
| 28 | 30 pf. |
| 29 | 6K ohm. |
| 30 | 10K ohm. |
| 31 | 500 pf. |
| 32 | Ge-diode. |
| 33 | 50K ohm. |
| 34 | 2.5K ohm. |
| 35 | 1M ohm pot. |
| 36 | 0.2 mf. |
| 37 | 50K ohm. |
| 38 | 30K ohm. |
| 39 | 500 pf. |
| 40 | 180K ohm. |
| 41 | Ge-diode. |
| 42 | 200K ohm. |
| 43 | 50 nf. |
| 44 | Ge-diode. |
| 45 | 100K ohm. |
| 46 | 90K ohm. |
| 47 | 100K ohm. |
| 48 | 100K ohm. |
| 49 | 5K ohm. |
| 50 | 300K ohm. |
| 51 | 80K ohm. |
| 52 | 10K ohm. |
| 53 | 10K ohm. |
| 54 | 20 pf. |
| 55 | 20 pf. |
| 56 | 300K ohm. |
| 57 | K ohm pot. |
| 58 | 1 nf. |
| 59 | 10K ohm. |
| 60 | 5K ohm. |
| 61 | 5K ohm. |
| 62 | 20 pf. |
| 63 | 20 pf. |
| 64 | 800K ohm. |
| 65 | 800K ohm. |
| 66 | 100K ohm. |
| 67 | 100K ohm. |
| 68 | 1.2K ohm. |
| 69 | 40K ohm. |
| 70 | 50K ohm. |
| 71 | 10K ohm. |
| 72 | 5K ohm. |
| 73 | 5K ohm. |
| 74 | 20 pf. |
| 75 | 20 pf. |
| 76 | 800K ohm. |
| 77 | 800K ohm. |
| 78 | 40K ohm. |
| 79 | 100K ohm. |
| 80 | 100K ohm. |
| 81 | 1.2K ohm. |
| 82 | 50K ohm. |
| 83 | Ge-diode. |
| 84 | Ge-diode. |
| 85 | 500 pf. |
| 86 | 200K ohm. |
| 87 | 50K ohm. |
| 88 | 50K ohm. |
| 89 | 5K ohm. |
| 90 | 100 nf. |
| 91 | 1M ohm. |
| 92 | 2.5K ohm. |
| 93 | 20K ohm. |
| 94 | 50K ohm. |
| 95 | Ge-diode. |
| 96 | Ge-diode. |
| 97 | Ge-diode. |
| 98 | 30K ohm. |
| 99 | 25K ohm. |
| 100 | 100K ohm. |
| 101 | Si-diode. |
| 102 | 5M ohm. |
| 103 | Si-diode. |
| 104 | Si-diode. |
| 105 | 1 mf. |
| 106 | 100K ohm. |
| 107 | 2K ohm pot. |
| 108 | 100K ohm. |
| 109 | 250 pf. |
| 110 | 1K ohm. |
| 111 | Ge-diode. |
| 112 | 1K ohm. |
| 113 | 250 pf. |
| 114 | 100K ohm. |
| 115 | 2K ohm pot. |
| 116 | 100K ohm. |
| 117 | Si-diode. |
| 118 | Si-diode. |
| 119 | 30K ohm. |
| 120 | 25K ohm. |
| 121 | 100K ohm. |
| 122 | Si-diode. |
| 123 | 5M ohm. |
| 124 | 1 mf. |

| Element | Value |
|---|---|
| 125 | 100K ohm. |
| 126 | 20K ohm. |
| 127 | 2.5K ohm. |
| 128 | 50K ohm. pot. |
| 129 | 50K ohm. |
| 130 | 20K ohm. |
| 131 | Diode. |
| 132 | Relay trls 65a. |
| 133 | 20K ohm. |
| 134 | 50K ohm. |
| 135 | 100K ohm. |
| 136 | 20K ohm. |
| 137 | 2.5K ohm. |
| 138 | 5K ohm. |
| 139 | 10K ohm pot. |
| 140 | Relay trls 64. |
| 141 | 100K ohm. |
| 142 | 5K ohm. |
| 143 | 1 mf. |
| 144 | 20K ohm. |
| 145 | 2.5K ohm. |
| 146 | Switch. |
| 147 | Output. |

Tubes in Stages R1 to R9 are of the tubes E 88 CC. + and − are connections for 200 volt potential.

FIGURE 3 shows a time interval comparison network pertaining to an apparatus according to this invention, which network is made up of digital components but following the general outline of FIGURE 1. The apparatus here shown can be combined with a filter and an amplifier as was shown and described for instance, with reference to FIGURE 1.

The filtered and amplified heart sound signal is fed into the Schmitt trigger 148 which operates as a pulse discriminator and pulse generator. The output of trigger 148 is connected to flip-flop circuit 150 having two distinct input terminals. The flip-flop circuit 150 is connected with another flip-flop circuit 151 so that flip-flop 151 will be activated simultaneously with the activation of the flip-flop circuit 150. A pulse gate is connected to the flip-flop circuit 151 which is acted upon by a clock pulse train of 200 c.p.s corresponding to a pulse spacing of 5 msec. generated by clock pulse generator 151. This pulse gate may be incorporated in the first stage of a counter 152 so that flip-flop 151 governs the passage of pulses from generator 161 into a delay and reset pulse generator 152.

After 100 msec. (count-to-twenty), the binary counter 152b gives a control and reset pulse to the flip-flop circuit 150, thereby returning flip-flop 150 to its initial state. Flip-flop 150 is thus being made receptive for another heartbeat pulse.

Simultaneously, gating terminal 153 is being prepared by flip-flop 150 for resetting flip-flop 151.

The binary counter 152a, after the end of one complete counting cycle (i.e. 120 milliseconds) will return the flip-flop 151 to its initial state, but only if the flip-flop circuit 150 is still in its initial state keeping gate 153 open.

If during the period of time from 100 to 120 milliseconds of a counting cycle of the binary counter 152a, the flip-flop circuit 150 has been switched over by a new heart sound, then the gating terminal 153 of flip-flop circuit 151 will be blocked again so that this flip-flop cannot be reset and it remains activated and the delay generator 152 continues to run on. Only after the expiration of further 100 millisecond periods, corresponding to twenty counting units, flip-flop 150 will be ready again for another heartbeat. Thus, flip-flop circuit 151 remains in the state which it assumed after the very first pulse. Flip-flop 151 is not being reset for stopping delay generator 152 as long as any disturbance occurred in the said 100–120 millisecond interval. The result will be that from the output of flip-flop 151 no signal can leave for further processing.

If during the said critical time interval of 100 to 120 milliseconds after the beginning of the first pulse no new heart sound or a disturbance arrives at the input terminal, the flip-flop circuit 151 will be returned to its initial condition and will give a pulse to the input terminal of a flip-flop circuit 154. The latter flips over at the end of each completed cycle of the delay generator 152 and will thus normally separate the first and second heart sounds. The two output terminals of the flip-flop circuit 154 are respectively connected with input terminals of a flip-flop circuit 155 and of a flip-flop circuit 156.

Fip-flop circuit 155 has its output terminal connected to the gating terminal of a pulse gate 157 governing the transmission of clock pulses from clock pulse source 161 to a main counter 159. Flip-flop 155 opens the gate 157 when receiving a pulse from flip-flop 154, i.e., 120 milliseconds after a first heart sound, and prevents its closing until at least 120 milliseconds after the next second heart sound. Reset for flip-flop 155 is controlled flip-flop 151 and closes gate 157.

The main counter 159 is constructed as an eight-step binary counter. One output terminal from every binary stage of the main counter 159 is connected with a digital analog converter 162 which is reconstructed in such a manner that at its outlet there will be a voltage proportional to the heart rate, in the range of 45 to 200 beats per minute. All outlets of the binary stages are also connected with a coincidence-network 163.

A flip-flop circuit 156 is connected to the gating terminal of a pulse gate 158 governing transmission of clock pulses from generator 161 to an auxiliary counter 160. Counter 160 starts to count 120 ms. after a second heart sound occurs. This flip-flop circuit 156 is likewise reset by flip-flop 151 and closes the pulse gate 158 at the beginning of heart sound, namely the next second heart sound. As soon as the pulse gate 158 is closed, the value that is accumulated in auxiliary counter 160 will be taken over by the binary register 164 through a transfer and reset stage 165 connected between the auxiliary counter 160 and the binary register 164. The main counter 159 is reset to zero at the end of each cycle, while the auxiliary counter 160 is reset to minus three.

At its end of the counting period auxiliary counter 160 will therefore show a value that is three units, corresponding to 15 msec., too small. Consequently, the value delivered to the binary register 164 is 15 msec. smaller than the time actually measured. As soon as the main counter 159 and the binary register 164 show the same value, the coincidence-network 163 will deliver a control pulse. Since the binary register 164 during operation always contains the record of a preceding measurement, the control pulse will be produced by the coincidence network 163 whenever the main counter 159 arrives at the value of the binary register 164.

The coincidence-network 163 has connected to it a tolerance-counter 166 and a flip-flop 167. The tolerance-counter is constructed as a three-stage binary counter which counts up to "six." This binary counter 166 commences to count when a control pulse appears at the coincidence-network 163, and at the same time the flip-flop circuit 167 is activated. The latter will reset after tolerance counter 166 has run off, hence after 30 milliseconds. To the analog-matrix 162 is connected a switch 168 and to the latter an analog store 169. The switch 168 is controlled by the flip-flop circuit 167, through end gate 172 in such a manner that the switch will be closed if a subsequent heartbeat closes the main counter 159 within the running time of the tolerance-counter, hence within 30 milliseconds. The value that is now in the digital analog converter 162 is then transferred to the analogy store 169. At its outlet a voltage proportional to the heartbeat frequency will be available for indication or recording purposes. The main counter 159 and the auxiliary counter 160 are always reset shortly before the end of a cycle of 120 milliseconds duration of the preliminary counter 152.

It will be observed that with the apparatus described above, control and measuring pulses become effective only if they have a predetermined spacing when they enter the apparatus. Continuous noises, which by themselves would also be effective as periodic signals, will be rendered ineffective by the operation of the delay generator 152. Slow changes of heartbeat frequency are compensated for without difficulty, provided the change of one heart sound period from one period to the next one is less than 15 milliseconds. It is also especially advantageous that the measurements by this apparatus depend for their accuracy only on the stability of the input frequency and on the digital to analog converter. In both of these cases, a high degree of stability can readily be obtained. Special preparations for making measurements are not necessary. It is only necessary to provide an adequate signal voltage level at the discriminator and input stage. Special training in the use of the apparatus will not be necessary.

Another possibility is to use characteristic events of heart activity obtained by other than acoustical methods for controlling the comparator circuit. For example, an inpulse that was obtained from an electro-acoustic transformer of the first or second heart sound can be combined with the R-peak of an electrocardiogram. In such a manner a comparison of impulse intervals is undertaken only in those cases where both an impulse from the heartbeat and from the electrocardiogram are available. This can be done in a simple manner by means of an AND circuit.

Figure 7:
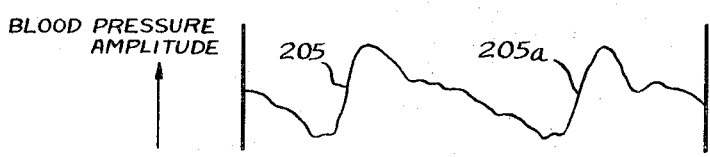
FIGURE 7 shows the pressure changes during the carotid impulse.
Figure 6:
FIGURE 6 shows the pressure changes during the radial impulse.
Figure 5:
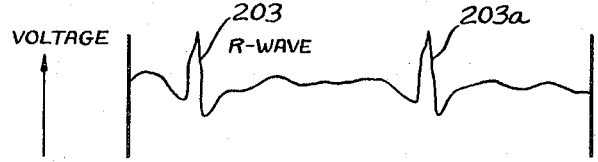
FIGURE 5 is an electrocardiogram.

From FIGURES 6 and 7 it can be seen that in the last phase of systole (expulsion of the blood from the heart) a quick increase of pressure of the carotid and radial artery occurs. By detection, and if necessary differentiation, electrical impulses can be readily generated. The impulses in the pressure-increasing sections 204 and 205 of FIGURES 6 and 7 are shifted in phase relative to the impulses 201 and 203 so that under these conditions it is generally possible to control the comparator circuit by the method described above.

It is also possible to include more than two impulses for a comparison where impulses with only a slight phase spacing are preferably brought together by an AND circuit. For example, the impulses 201 and 203 are conducted to one AND circuit and the impulses from the portions 204 and 205 of the curves to another AND circuit, while the outputs from these two AND circuits are fed into a comparator circuit. Instead of the AND circuits, it is also possible to use OR circuits which are preferably controlled in such a manner that impulses can be received by them only when they are in certain predetermined conditions, which will make the system less sensitive to disturbances.

Figure 4:
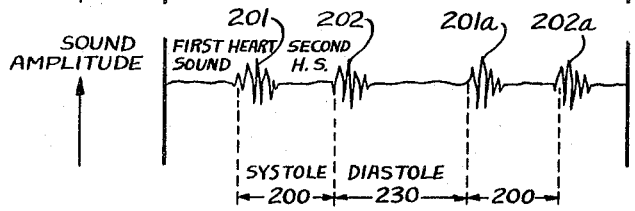
FIGURE 4 is a heart sound diagram.

Further comparisons can be made, e.g. of the intervals between the first and second heart sounds (FIG. 4, 200) with the intervals between the second and the ensuing first heart sounds (FIG. 4, 230). In other words, comparisons can be made of all time intervals which are in a definite order or relation to each other so as to give some information about heart activity.

The apparatus for performing the process of time interval comparison with signals according to FIGURES 5 through 8, is as shown in FIGURES 1 through 3. Minor changes are necessary if impulses from different sources are used or when impulses with slight phase spacings are to be evaluated. In the first case, the impulses can be delivered to a mixing stage. In the other case, use is preferably made of an AND or OR circuit. For time comparison use can also be made of a forward-backward counting circuit or a summation circuit.

The process of this invention can be used not only for the measurement of heartbeat frequencies, but also for the measurement of other periodic functions of heart activity, e.g. blood pressure, or for observing excitation and contraction sequencies in the heart, so as to permit dependable indication of limiting values and the control of therapeutic devices, e.g. defibrillators and step makers.

For blood pressure measurements, a comparator circuit effecting a measurement or comparison of the two phase points of a heart action, using e.g., a characteristic heart sound or noise, known as "Korotkoff" sounds, may be used.

As component parts for the construction of this apparatus, the usual articles of commerce such as flip-flop circuits, binary counters, etc., can be used.

The invention is not limited to the embodiments described above, but all changes and modifications thereof not constituting departures from the spirit and scope of the invention are intended to be covered by the following claims.

What is claimed is:

1. Apparatus for determining the hearbeat frequency comprising: sensing means for producing electrical output signals representative of pulsating heart action; a bandpass filter having a passing range with a lower frequency limit of about 30 cycles per second to 55 cycles per second and being connected to said sensing means; discriminator and pulse producing means connected to said filter and responsive to at least two time-separated characteristic information as represented by said output signals after passage thereof through said filter, and as occurring during each heart action cycle, and producing corresponding output pulses; separating means connected to said pulse producing means and having at least two output channels for separating said measuring pulses so that each channel receives a series of output pulses with each pulse of any one series corresponding to one characteristic information per heart action cycle; and comparator means connected to said channels for mutually comparing the pulse rates of said series.

2. Apparatus as set forth in claim 1, said filter having adjustable passage range.

3. An apparatus for comparing the time intervals between successive heartbeat cycles comprising at least one AND circuit connected ahead of the apparatus defined in claim 1.

4. An apparatus for comparing the time intervals between successive heartbeat cycles comprising at least one OR circuit connected ahead of the apparatus defined in claim 1.

5. An apparatus for comparing the time intervals between successive heartbeat cycles comprising a mixing stage connected ahead of the apparatus defined in claim 1.

6. Apparatus for determining the heartbeat frequency comprising: electroacoustical transducer and bandpass filter means producing electrical output signals representative of heart action and within a range of about 30 cycles per second to 100 cycles per second; an amplitude discriminator connected to said filter means and responsive to two distinct output signals representing time-separated phases within each heart action cycle, and producing two corresponding measuring pulses; measuring pulse separating means connected to said discriminator means and having two output channels, each channel receiving a series of pulses, with the pulses in each channel corresponding to measuring pulses representing one phase in each heart action cycle; and comparator means connected to said channels for mutually comparing the pulse rates of said two series.

7. Apparatus as set forth in claim 6, which includes an amplifier having automatic gain control and serially connected between said filter means and said discriminator.

8. Apparatus for determining the heartbeat frequency comprising: sensing means for producing electrical output signals representative of pulsating heart action; a bandpass filter with a lower frequency limit ranging from 30 to 55 cycles per second and connected to said sensing means; discriminator means connected to said filter and responsive to two distinct time-separated phases as represented by said output signals within each heart action cycle, and producing two corresponding measuring pulses, each pulse being of constant duration and height; separating means connected to said discriminator means and having two output channels, each channel receiving a series of pulses, with the pulses in each channel corresponding to measuring pulses representing one phase in each heart action cycle; and comparator means connected to said channels for mutually comparing the pulse rates of said two series.

9. Apparatus as set forth in claim 8, said separating means being insensitive for any further measuring pulse during the duration of any measuring pulse.

10. Apparatus for determining the heartbeat frequency comprising: electroacoustical transducer means producing electrical output signals representative of heart action; a bandpass filter having a passing range within a range of about 30 cycles per second to 100 cycles per second connected to said sensing means; discriminator and pulse producing means connected to said filter being responsive to the output signals thereof representing systole and diastole and producing corresponding measuring pulses; separating means responsive to said measuring pulses and having two output channels respectively receiving a series of pulses corresponding to systol and diastole; and comparator means connected to said channels for mutually comparing the pulse rates thereof.

11. Apparatus for determining the heartbeat frequency comprising: electroacoustical transducer means producing electrical output signals representative of heart action; a bandpass filter having a passing range within a range of about 30 cycles per second to 100 cycles per second connected to said sensing means; discriminator and pulse producing means connected to said filter and responsive to the output signals thereof representing systole and diastole and producing corresponding measuring pulses; an electronic flip-flop having two output channels and being actuated by said measuring pulses; and comparator means connected to said channels of said flip-flop for mutually comparing the pulse rates in said channels.

12. Apparatus for determining the heartbeat frequency comprising: electroacoustical transducer means producing electrical output signals representative of heart action; a bandpass filter having a passing range of about 30 cycles per second to 100 cycles per second connected to said sensing means; discriminator and pulse producing means connected to said filter and responsive to two output signals representing distinct time-separated phases within each heart action cycle, and producing two corresponding measuring pulses, each pulse having a constant duration during which said discriminator and pulse producing means is insensitive for further reception through said filter; separating means connected to said discriminator means and having two output channels each receiving a series of pulses, with the pulses in each channel corresponding to measuring pulses representing one phase in each heart action cycle; means connected for rendering said separating means additionally insensitive for a period of time corresponding to the lowest bandpass filter frequency; and comparator means connected to said channels for mutually comparing the pulse rates of said series.

13. Apparatus for determining the heartbeat frequency comprising: electroacoustical transducer means producing electrical output signals representative of heart action; a bandpass filter having a passing range within a range of about 30 cycles per second to 100 cycles per second connected to said sensing means; discriminator and pulse producing means connected to said filter and responsive to two distinct time-separated phases as represented by said output signals within each heart action cycle, and producing two corresponding measuring pulses; measuring pulse separating means connected to said discriminator means and having two output channels, each receiving a series of pulses, with the pulses in each channel corresponding to the measuring pulses representing one phase in each heart action cycle; a converter connected to each channel for producing a voltage the magnitude of which is corresponding to the time interval in between two succeeding pulses of the channel in which it is connected; and a comparator connected to said two converters for comparing the voltages thereof.

14. Apparatus as set forth in claim 13, said converter including a Miller integrator.

15. Apparatus for determining the hearbeat frequency comprising: electroacoustical transducer means producing electrical output signals representative of heart action; a bandpass filter having a passing range within a range of about 30 cycles per second to 100 cycles per second connected to said sensing means; discriminator and pulse producing means connected to said filter and responsive to two distinct time-separated phases as represented by said output signals within each heart action cycle, and producing two corresponding measuring pulses; separating means connected to said discriminator means and having two output channels, each receiving a series of pulses, with the pulses in each channel corresponding to the measuring pulses representing one phase in each heart action cycle; a clock pulse generator; counting means associated with each channel and counting the number of clock pulses elapsing in between the occurrence of two pulses in said channel; and means for comparing the result of counting of each counting means.

16. Apparatus for determining the heartbeat frequency comprising: sensing means for producing electrical output signals representative of pulsating heart action; discriminating and pulse producing means connected to said sensing means and responsive to at least two time-separated characteristic information as represented by said output signals within each heart action cycle; separating means having at least two output channels for separating said measuring pulses so that each channel receives a series of output pulses with each pulse of any one series corresponding to one characteristic information per heart action cycle; resetting means connected to said discriminating and pulse producing means for counting a predetermined number of measuring pulses and resetting said separating means at said two channels to zero output after said number has been counted; and comparator means for comparing the pulse rate of one series with the pulse rate of any other series.

17. Apparatus for determining the heartbeat frequency comprising: electroacoustical transducer means producing electrical output signals representative of heart action; a bandpass filter having a passing range within a range of about 30 cycles per second to 100 cycles per second connected to said sensing means; discriminator and pulse producing means connected to said filter and responsive to two distinct time separated phases as represented by said output signals within each heart action cycle, and producing two corresponding measuring pulses; a differentiating stage connected to said pulse producing means for differentiating said measuring pulses; a flip-flop means connected to said differentiating stage for actuation therefrom and having two output channels each receiving a series of pulses corresponding to the measuring pulses representing one phase as repeated with each heart action cycle; and comparator means connected to said channels for comparing the rates of pulses of said series.

18. Apparatus for determining the heartbeat frequency comprising: sensing means producing electrical output signals representative of pulsating heart action; discriminating and pulse producing means connected to said sensing means and responsive to at least two time-separated characteristic information as represented by said output signals within each heart action cycle; each of said measuring pulses having a duration in the order of magnitude of $10^{-1}$ seconds; separating means having at least two output channels for separating said measuring pulses so that each channel receives a series of output pulses with each pulse thereof corresponding to one characteristic information per heart action cycle; and comparator means connected to said channels for mutually comparing the pulse rates thereof.

19. Apparatus for determining the heartbeat frequency comprising: a converter for converting heartbeats into electrical signals by means of an impulse-former connected therewith, a flip-flop circuit through which the signals are passed and which is controlled by the pulseformer, a second flip-flop circuit connected to the first one and which is actuated by opening the first flip-flop circuit to actuate a pulse gate, a binary counter connected to the second flip-flop circuit and back-coupled in such a manner that it is traversed once in about 120 milliseconds and after about 100 milliseconds gives a control pulse to the first flip-flop circuit so as to return the latter to its initial condition, a connection between the binary counter and the second flip-flop circuit which will return the latter to its initial position after about 120 milliseconds, while the first flip-flop circuit is still in its initial position, a third flip-flop circuit connected to the second one and which slips over whenever a binary counter cycle is completed, a fourth and a fifth flip-flop circuit which are connected to the outlet of the third flip-flop circuit, and which are in turn connected to a third pulse gate, whereby the second pulse gate is connected with a main counter and the third pulse gate with a supplementary counter, these two counters being constructed as binary counters, an analogue-matrix connected to the main counter and so constructed that at its outlet there will be a voltage proportional to the heartbeat frequency, a recorder connected to the auxiliary counter, a transmitting and quenching stage which upon closing of the third pulse gate will transmit to the recorder the value that is stored in the auxiliary counter, said value being transmitted through a coincidence-network which will produce a control pulse when the values of the main counter agree with those of the recorder, the arrangement being such that at the end of every period the main counter is returned to zero and the auxiliary counter to a value corresponding to about 15 milliseconds, a tolerance counter which can count to about 30 milliseconds, a sixth flip-flop circuit which opens when the tolerance-counter begins counting and closes at the end of the counting and actuates a switch connected to the analogue-matrix for controlling the entire counter and the second and third pulse gates through an analogue-recorder connected to said switch.

20. Apparatus for determining the heartbeat frequency comprising: sensing means producing electrical output signals representative of pulsating heart action; signal discriminating and pulse producing means connected to said sensing means and responsive to at least two time-separated characteristic information as represented by said output signals within each heart action cycle and producing corresponding measuring pulses; separating means connected to said pulse producing means and having at least two output channels for separating said measuring pulses so that each channel receives a series of ouput pulses with each pulse in any one channel corresponding to one characteristic information per heart action cycle; comparator means connected to said channels for mutually comparing the pulse rates thereof, an amplifier with a hyperbolic reference line through which the output signal from said comparator means is passed, and a registering device connected to receive the output signal from said amplifier.

21. The method for accurate measurement of heartbeat frequency comprising:
(a) picking up the heartbeat activity signals and transducing them into electrical signals;
(b) filtering said electrical signals to get pulse-like second electrical signals of at least two eminent phases of every heart action cycle;
(c) measuring the time intervals between successive second signals of each of said phases;
(d) comparing the time intervals corresponding to the difference of said phases;
(e) generating an indicating pulse only when the ratio of at least two successions of said time intervals corresponding to different phases is within definite limits; and
(f) counting the number of indicating pulses per second and proportioning them to the heartbeat frequency.

22. The method of claim 21, in which said electrical signals are filtered in (b) by a band-pass pervious to frequencies in the range of 50 to 90 cycles per second.

23. A method for the measurement of the functioning of heart activity comprising:
(a) picking up the heartbeat cycle signals and transducing them into electrical signals;
(b) filtering said electrical signals to get pulse-like second electrical signals of the time intervals between heartbeat cycles;
(c) measuring the time intervals between said second electrical signals whereby the time intervals between heartbeat cycles are determined;
(d) comparing the time intervals between successive heartbeat cycles;
(e) generating an indicating impulse when the compared time intervals are in a predetermined timed relation to one another; and
(f) counting the indicating impulses.

24. The method of claim 23, wherein the successive heartbeat cycles of (d) are the first and second heartbeat cycles.

25. The method of claim 23, wherein the heartbeat cycle of (a) is picked up from an electrocardiogram.

26. The method of claim 23, wherein the heartbeat cycle of (a) is picked up from the pulse.

27. The method of claim 23, wherein the heartbeat cycle of (a) is picked up from a measurement of blood pressure.

28. The method of claim 23, wherein the pulse-like second electrical signals obtained in (b) represent said electrical signals of (a) having a predetermined amplitude.

29. The method of claim 23, wherein the pulse-like second electrical signals obtained in (b) represent said electrical signals of (a) having a predetermined sequented order.

References Cited by the Examiner
UNITED STATES PATENTS

| | | | |
|---|---|---|---|
| 3,087,488 | 4/1963 | Streimer | 128—2.05 |
| 3,132,208 | 5/1964 | Dymski et al. | 128—2.05 X |
| 3,132,643 | 5/1964 | Baum et al. | 128—2.05 X |
| 3,140,710 | 7/1964 | Glassner et al. | 128—2.05 X |
| 3,171,892 | 3/1965 | Pantle | 128—2.05 X |

RICHARD A. GAUDET, *Primary Examiner.*

SIMON BRODER, *Examiner.*